Feb. 5, 1963   N. H. SHAPIRA   3,076,534
CONNECTOR FOR PANELS OR OTHER PLATE SHAPED MEMBERS
Filed Dec. 1, 1958   2 Sheets-Sheet 1
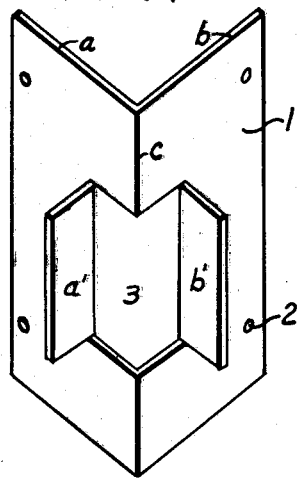
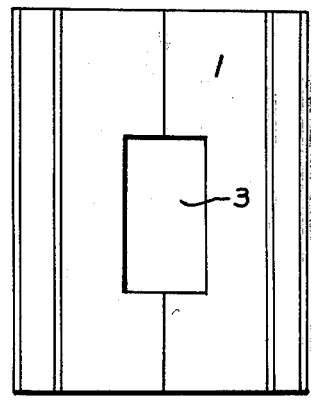
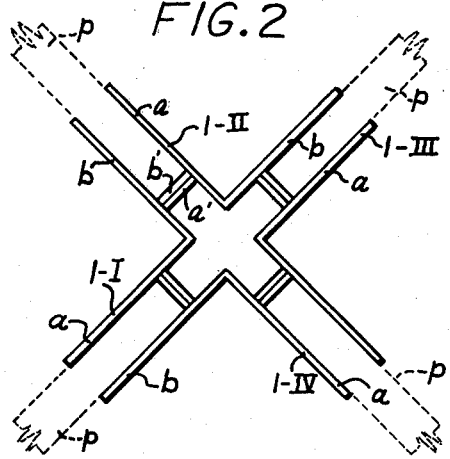
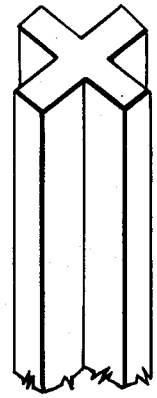
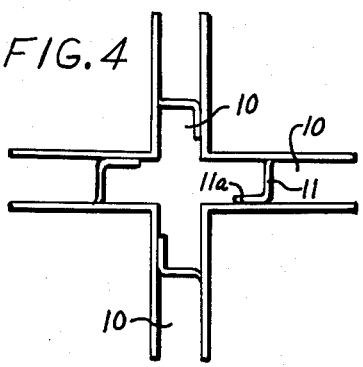
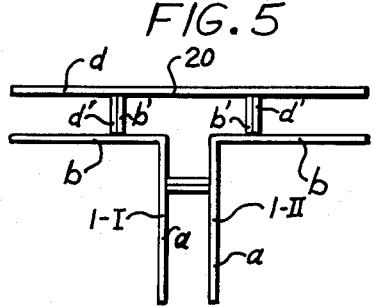
INVENTOR.
NATHAN HENRY SHAPIRA
BY
Corey, Hart & Stemple
ATTORNEY Feb. 5, 1963 N. H. SHAPIRA 3,076,534
CONNECTOR FOR PANELS OR OTHER PLATE SHAPED MEMBERS
Filed Dec. 1, 1958 2 Sheets-Sheet 2

INVENTOR.
NATHAN HENRY SHAPIRA
BY
Corey Hart & Stemple
ATTORNEY

United States Patent Office 3,076,534
Patented Feb. 5, 1963

3,076,534
CONNECTOR FOR PANELS OR OTHER PLATE SHAPED MEMBERS
Nathan Henry Shapira, Maharal St. 16, Tel-Aviv, Israel
Filed Dec. 1, 1958, Ser. No. 777,374
Claims priority, application Israel Aug. 1, 1958
7 Claims. (Cl. 189—35)

The present invention relates to a connector by means of which panels extending in vertical or horizontal planes, in angular relation with each other, can easily be connected. It is the main object of this invention to provide a connector which can be employed in holding in position temporary or permanent partition walls, structural units for prefabrication purposes in the erection of shelves, furniture and the like.

It is another object of the invention to provide a method for the quick erection of partition walls in buildings. Yet another object of the invention is to provide a method for the assembly of furniture from prefabricated standard elements, with the use of the new connector.

The new connector comprises at least two angle sections and a plate, or four angle sections, the angle sections being so positioned that a flange of one angle is in parallel with that of another and distanced therefrom, the plate—if any—is positioned in parallel with the other flanges of the section and distant therefrom, the connection between parallel parts (i.e. whether parallel flanges or a flange and a plate portion) being achieved by a punched-out portion of a flange being bent towards its opposite and parallel counterpart and being welded thereto.

In a preferred embodiment of the invention flaps are punched out of each of the flanges and the flanges of oppositely positioned angle sections are laid on each other and spotwelded to each other.

The invention will be fully understood from the following description with reference to the annexed drawings.

FIGURE 1 shows in a perspective view an angle section prepared for connection with similar sections to form a connector according to the invention.

FIGURE 2 is a plan view of the new connector composed of four such angle sections and used for connecting four panels forming a cross.

FIGURE 3 is an elevational view of the connector shown in FIGURE 2.

FIGURE 4 shows a like connector of slightly modified construction.

FIGURE 5 is a top view of a connector composed of two angle sections and a plate, used in connecting three panels meeting at a T.

FIGURE 7 shows an auxiliary element, used in association with the new connectors.

Figure 8:
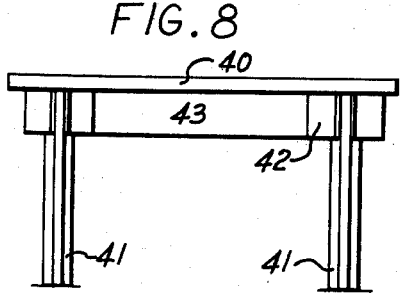
FIGURE 8 shows a table built up with the use of the new connector, as seen in elevation.

It will be understood that the examples of practical uses for the new connectors are a few out of a very great number of possibilities. Thus the annexed drawings are not to be considered as restricting the invention to the examples shown.

Turning first to FIGURE 1, the basic element from which the new connectors are built-up is an angle section 1 preferably bent from an appropriately cut plate of sheet metal. Out of each of the flanges $a$ and $b$ of the section 1 flaps $a'$ and $b'$ are punched and bent outwardly through 90°. The punching and bending of the flaps will preferably be done prior to bending the member 1 about its median line $c$ into its final form.

FIGURE 2 illustrates a connecting member built up from the basic element 1. Here four members 1 form a cross-shaped connector. For better understanding the four elements 1 are marked I—I, I—II, I—III, I—IV. Flange $a$ of 1–I lies opposite flange $b$ of 1–IV, and flange $b$ of 1–I lies opposite flange $a$ of 1–II, and flange $b$ of the latter lies opposite flange $a$ 1–I and so on. The four members are connected by a flap $b'$ of one member lying on a flap $a'$ of the opposite member these two flaps being connected to each other in an appropriate manner e.g. by welding, as at X. The weld is preferably a spotweld. It will be seen that into such a cross member four panels can be introduced and held therein. Preferably holes 2 are provided in the flanges facilitating the screwing of the connectors to the panels. It would of course be possible to stape or nail the connectors to the panels.

As can be seen in FIGURE 2 the panels can enter the space between the two flanges up to the flaps $a'$, $b'$ so that a cross shaped space remains empty at the centre of the connector. This empty space can be used for passing therethrough electrical connections and the like, the laying whereof is facilitated by the central space being accessible through openings 3 in the connectors resulting from punching out the flaps. After the erection of partition walls held together by the connectors the gaps between panels may be covered by appropriate strips of material. However, I prefer to use an arrangement which will be described later.

According to FIGURE 4 a slightly different arrangement has been used. Here four angle sections 10 form a connector as already described. However instead of punching a narrow flat flap out of each angle, a flap 11 is punched out of one of the angles and is bent itself to form an angle which is of such dimensions that flange 11a can contact one of the flanges of the opposite member 10, to be spotwelded thereto at Y. Thus while in the foregoing construction according to FIGURE 2 each flange of a member 1 is connected wtih the opposite flange, that is to say each member 1 is connected with both members flanking it, in the arrangement according to FIGURE 4 a member 10 is connected with one flap 11 to one opposite member while a like flap of the member on its other side is connected with its other flange.

According to FIGURE 5 two members 1–I and 1–II are connected in the way already described. Their flanges $a$ and $a$ are positioned in parallel while their flange $b$ extends in a common plane. Opposite the plane of flange $b$ a plate $d$ is arranged out of which flaps $d'$ are punched to be connected in the manner described with the flaps $b'$ of flanges $b$. This connector will serve, as can easily be seen, for the connection of three panels arranged to form a T.

In association with my connectors I preferably use a special element which fills the empty space in the centre of the connectors and which serves the further purpose of erecting partitions or building up shelves etc. with greater speed. This element is shown in FIGURE 7. It is a rod of cross shaped profile and is designed and dimensioned to fill the empty, cross-shaped space in the centre of a connector.

The use of this auxiliary element will become clear from the following: Say, partition walls have to be erected. First at appropriate points the cross profiled rods according to FIGURE 7 are set up to extend vertically from floor to ceiling of the room, after the connector according to FIGURE 2 or 4 has been slid thereon. Any number of connectors, according to the height of the panels to be connected can be slid on a rod. Then the connectors are screwed or nailed to the rod at appropriate levels and are ready to receive the panels to be held therein. In case that a connector according to FIGURE 5 is used, the rod will have T-profile.

Figure 10:
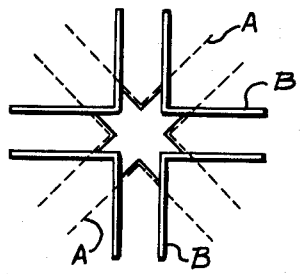
FIGURE 10 is another auxiliary member for use in association with the new connectors.
Figure 11:
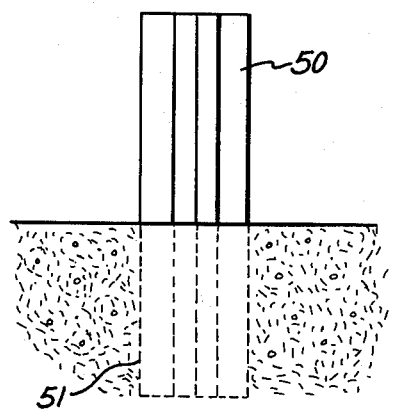
FIGURE 11 shows this element in position of use.

To set up the cross-profiled rods, there should be an emplacement in the floor of the room where the partitions are to be mounted. Such an emplacement safely holding the rod may be one of the connectors sunk in the floor. Alternatively, and especially in cases where the position of such an emplacement cannot be determined while the floor is constructed, a special peg is used which is shown in FIGURES 10 and 11, this peg has a star-shaped cross section. Its lower part 51 can be sunk into a concrete floor and secured therein or cast in. The upper star sectioned part 50 can receive one of the connectors slid thereon and this in two positions, as seen in the drawing, where A indicates one connector and B another one. Thus partitions extending at different angles can be held in the new way. Once, such a connector has been slid on the peg 1 the cross-profiled rod is set up, the rest of the connectors, according to the height of the panels, are put in place and the panels slid in.

Figure 9:
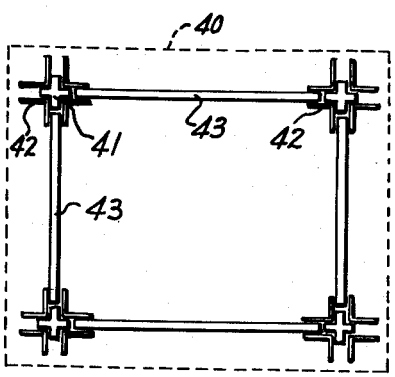
FIGURE 9 is the same table in an underneath view.
Figure 6:
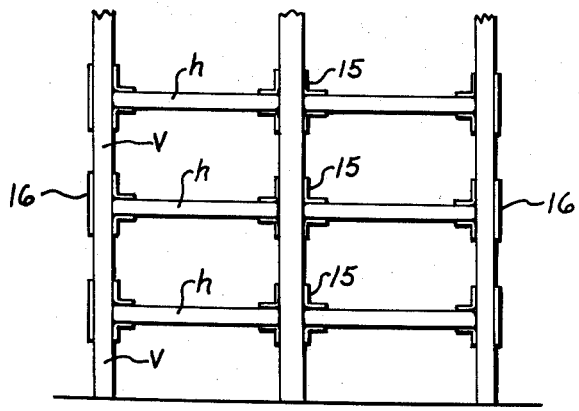
FIGURE 6 is a frontal view of a shelf arrangement built-up with the connectors according to the invention.

According to FIGURE 6 a shelf has been built up from short vertical boards $v$ and horizontal boards $h$ interconnected by the connectors according to the invention and marked 15, being connectors for four panels and 16 being connectors for three panels. After the above description the practical embodiment according to FIGURE 6 is self explanatory. According to FIGURES 8 and 9 a board 40, constituting the top of a table or desk is set on a supporting frame built up from four cross sectioned rods 41 serving as legs on top of each of which is fixed a connector 42. Boards 43 extend between and connect the four connectors, thus forming a four sided frame. The table will thus have the appearance of an ordinary conventional table and will nevertheless be easily dismountable.

Similar pieces of furniture can be built up in a like manner.

What I claim is:

1. A panel connector to maintain the position of said panel comprising at least two right angle members having a pair of planar sections integrally joined at said angle, one of said sections being parallel to and spaced from a corresponding section of the other member, the remaining two sections extending in a common line away from each other, each of said parallel sections including an integral flange extending toward, in juxtaposition with, and secured to the opposing flange, and a plate being parallel to and spaced from said remaining two sections, said remaining two sections each including a remaining flange extending toward said plate, and said plate including a pair of plate flanges corresponding to said remaining flanges extending toward and being in juxtaposition wtih and secured to said remaining flanges.

2. A panel connector to maintain the position of four panels comprising four right angle members having a pair of planar sections integrally joined at said angle, every section being parallel to and spaced from a corresponding section of another member to maintain the position of said four panels to describe a cross, and one of each pair of parallel sections including an integral flange extending toward and secured to said other parallel section.

3. The panel connector of claim 2 wherein every section includes a flange, said flanges of each parallel set of sections being in juxtaposition with, and secured to, each other, and said four right angle members being identical to one another.

4. The panel connector of claim 2 additionally comprising a peg having a cross profile filling the center space between said four members.

5. The panel connector of claim 2 additionally comprising a peg having an eight pointed star profile filling the center space between said four members.

6. A panel connector to maintain the position of four said panels comprising four right angle members having a pair of planar sections integrally joined at said angle, said members being positioned so that every section is spaced from and parallel to a section of another member, at least one of the sections of each parallel set having a cut-out flange extended toward and secured to the other parallel section of its set, said flange being spaced from all free edges of its associated section.

7. The panel connector of claim 6 wherein all sections include such a flange and the flanges of each parallel set of sections are in juxtaposition with, and secured to, each other.

References Cited in the file of this patent

UNITED STATES PATENTS

| 1,311,820 | Jones | July 29, 1919 |
| 2,013,763 | Olsen | Sept. 10, 1935 |
| 2,400,266 | Soffer | May 14, 1946 |
| 2,470,369 | Radeke | May 17, 1949 |

FOREIGN PATENTS

| 11,182 | Great Britain | of 1912 |
| 124,275 | Great Britain | Mar. 20, 1919 |
| 560,814 | Great Britain | Apr. 21, 1944 |
| 560,889 | Great Britain | Apr. 25, 1944 |